United States Patent [19]
Thiel et al.

[11] Patent Number: 5,999,864
[45] Date of Patent: Dec. 7, 1999

[54] METHOD OF POWER MANAGEMENT FOR A HYBRID POWERTRAIN SYSTEM

[75] Inventors: O. Kent Thiel, Chelesa; Arthur J. Buglione, White Lake Township., both of Mich.

[73] Assignee: Chrysler Corporation, Auburn Hills, Mich.

[21] Appl. No.: 08/839,121

[22] Filed: Apr. 23, 1997

[51] Int. Cl.$^6$ .................................................. G01M 15/00
[52] U.S. Cl. ............................. 701/22; 73/117.3; 701/35
[58] Field of Search .................................. 73/116, 117.2, 73/117.3, 118.1; 701/22–35

[56] References Cited

U.S. PATENT DOCUMENTS

| | | | |
|---|---|---|---|
| 3,874,472 | 4/1975 | Deane | 180/65 R |
| 3,886,810 | 6/1975 | Sugiyama et al. | 74/751 |
| 4,131,171 | 12/1978 | Keyes | 180/54 R |
| 4,148,192 | 4/1979 | Cummings | 60/716 |
| 4,165,795 | 8/1979 | Lynch et al. | 180/65 A |
| 4,309,620 | 1/1982 | Bock | 290/4 R |
| 4,583,505 | 4/1986 | Frank et al. | 123/198 F |
| 4,588,040 | 5/1986 | Albright, Jr. et al. | 180/165 |
| 4,597,463 | 7/1986 | Barnard | 180/165 |
| 4,631,456 | 12/1986 | Drescher et al. | 318/140 |
| 4,680,986 | 7/1987 | Elsner | 74/866 |
| 4,888,949 | 12/1989 | Rogers | 60/434 |
| 4,900,962 | 2/1990 | Hockney et al. | 310/90.5 |
| 4,961,352 | 10/1990 | Downer et al. | 74/5.46 |
| 5,176,213 | 1/1993 | Kawai et al. | 701/22 |
| 5,291,975 | 3/1994 | Johnson et al. | 188/378 |
| 5,318,142 | 6/1994 | Bates et al. | 701/22 |
| 5,319,273 | 6/1994 | Hockney et al. | 310/90.5 |
| 5,353,656 | 10/1994 | Hawkey et al. | 74/5.41 |
| 5,396,140 | 3/1995 | Goldie et al. | 310/268 |
| 5,427,194 | 6/1995 | Miller | 180/165 |
| 5,442,288 | 8/1995 | Fenn et al. | 324/244 |
| 5,465,015 | 11/1995 | Anastas et al. | 310/26 |
| 5,778,326 | 7/1998 | Moroto et al. | 701/22 |
| 5,832,396 | 11/1998 | Moroto et al. | 701/22 |
| 5,875,864 | 3/1999 | Yano et al. | 701/22 |

OTHER PUBLICATIONS

Popular Science, Emerging Technologies For The Supercar, Jun. 1994, pp. 1–2.

NASA Tech Briefs The Digest of New Technology, "Launching The Patriot", Jun. 1995, vol. 19, No. 6, pp. 1, 12, and 13.

Primary Examiner—George M. Dombroske
Attorney, Agent, or Firm—Mark P. Calcaterra

[57] ABSTRACT

A method of power management for a hybrid powertrain system includes the step of determining a storage power from a power flow into or out of an energy storage apparatus. The method also includes the step of determining an actual level of energy stored in the energy storage apparatus, determining a desired level of energy stored in the energy storage apparatus, and determining an energy storage level error from a difference between the desired level of energy stored and the actual level of energy stored. The method further includes the step of determining an engine power change from the energy storage level error and an actual storage power flow, determining an engine power setting from the engine power change, and modifying the engine by the engine power setting.

16 Claims, 4 Drawing Sheets

METHOD OF POWER MANAGEMENT FOR A HYBRID POWERTRAIN SYSTEM

BACKGROUND OF THE INVENTION

1. Field of the Invention

The present invention relates generally to powertrain systems in vehicles, and, more particularly, to a hybrid powertrain system in a motor vehicle.

2. Description of the Related Art

Since the invention of power vehicles, many different powertrain systems have been attempted, including a steam engine with a boiler or an electric motor with a storage battery. It was, however, the discovery of petroleum in 1856 and the four-stroke internal combustion engine invented by Otto in 1876, that provided the impetus for the modern automotive industry.

Although fossil fuel emerged as the fuel of choice for automotive vehicles, recent concerns regarding fuel availability and increasingly stringent federal and state emission regulations have renewed interest in alternative fuel powered vehicles. For example, alternative fuel powered vehicles may operate on methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a similar gasoline powered vehicle. Further, the acceleration is significantly less than that of a comparable gasoline powered vehicle.

A hybrid powered vehicle, powered by a renewable and a non-renewable energy source, overcomes the technical disadvantages of a dedicated electric vehicle while having almost the same environmental benefit as a dedicated electric vehicle. The performance and range characteristics are comparable to a conventional gasoline powered vehicle. Therefore, there is a need in the art for a hybrid powertrain system in a motor vehicle that is energy efficient, has low emissions, and offers the performance of a conventional gasoline powered vehicle.

SUMMARY OF THE INVENTION

It is, therefore, one object of the present invention to provide a method of power management for a vehicle.

It is another object of the present invention to provide a method of power management that balances the energy level in a hybrid powertrain system.

It is still another object of the present invention to provide an energy storage apparatus that can accept power during regenerative braking in a hybrid powertrain system.

It is a further object of the present invention to provide a method of power management that enhances vehicle performance.

It is yet a further object of the present invention to provide a method of power management that modifies an engine by a desired engine power setting.

To achieve the foregoing objects, the present invention is a method of power management for a hybrid powertrain system. The method includes the step of determining a storage power from a power flow into or out of an energy storage apparatus. The method also includes the step of determining an actual level of energy stored in the energy storage apparatus, determining a desired level of energy stored in the energy storage apparatus, and determining an energy storage level error from a difference between the desired level of energy stored and the actual level of energy stored. The method further includes the step of determining an engine power change from the energy storage level error and an actual storage power flow, determining an engine power setting from the engine power change, and modifying an engine power output by the engine power setting.

One advantage of the present invention is that a method of power management for a vehicle, including a hybrid powertrain system is provided. Another advantage of the present invention is that the method balances the energy level in the hybrid powertrain system by determining a difference between a desired level of power and an actual level of power. Still another advantage of the present invention is that a maximum level of energy is maintained in the energy storage apparatus, and power can be accepted during braking for a hybrid powertrain system. A further advantage of the present invention is that vehicle performance is enhanced without sacrificing the ability to recover energy during deceleration of the vehicle. Still a further advantage of the present invention is that the engine operates efficiently.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 6 is a power management system for a method of power management control for a hybrid powertrain system for a motor vehicle according to the present invention.

DESCRIPTION OF THE PREFERRED EMBODIMENT(S)

Figure 1:
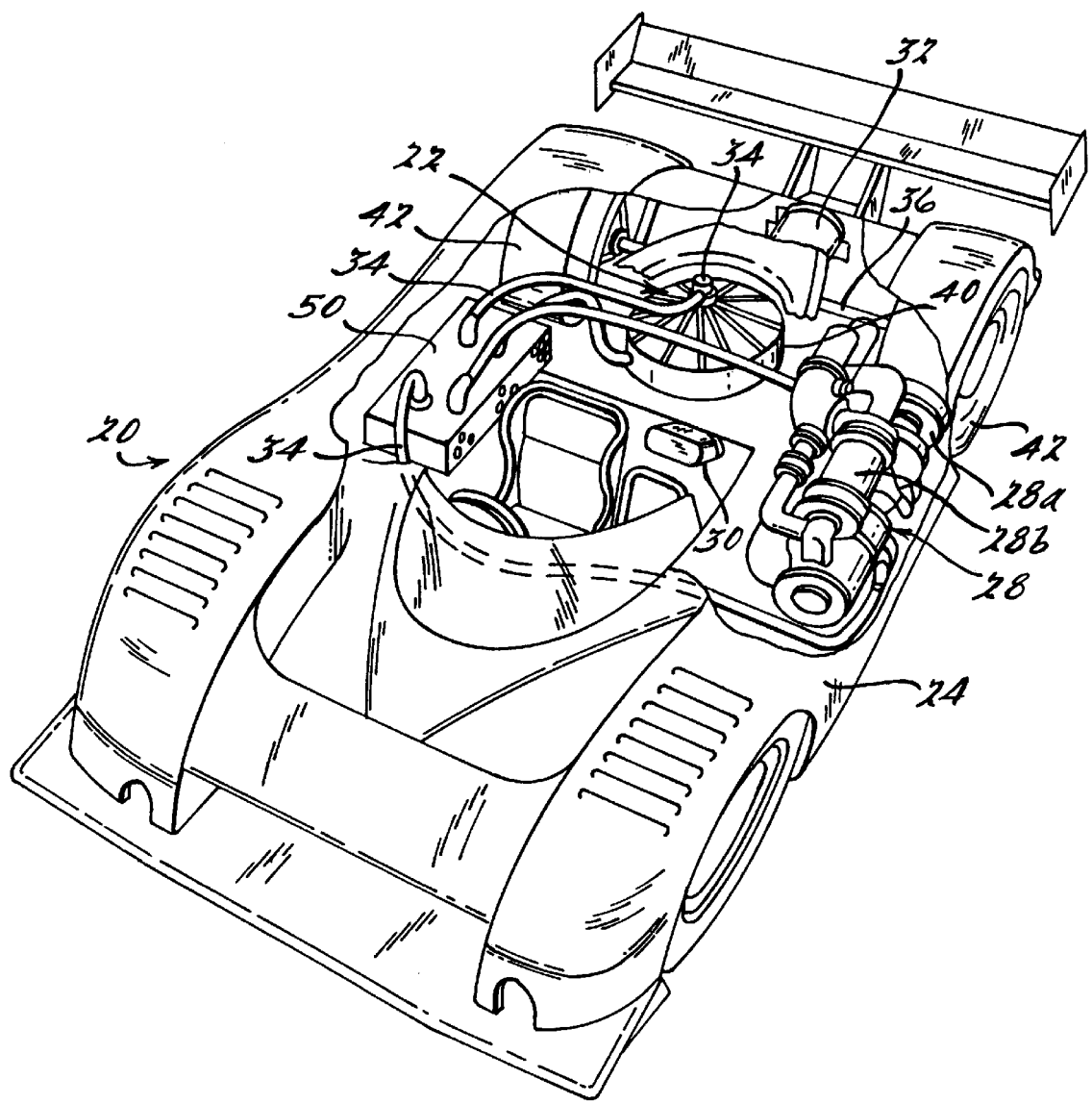
FIG. 1 is a schematic diagram of a hybrid powertrain system for a motor vehicle according to the present invention.
Figure 2:
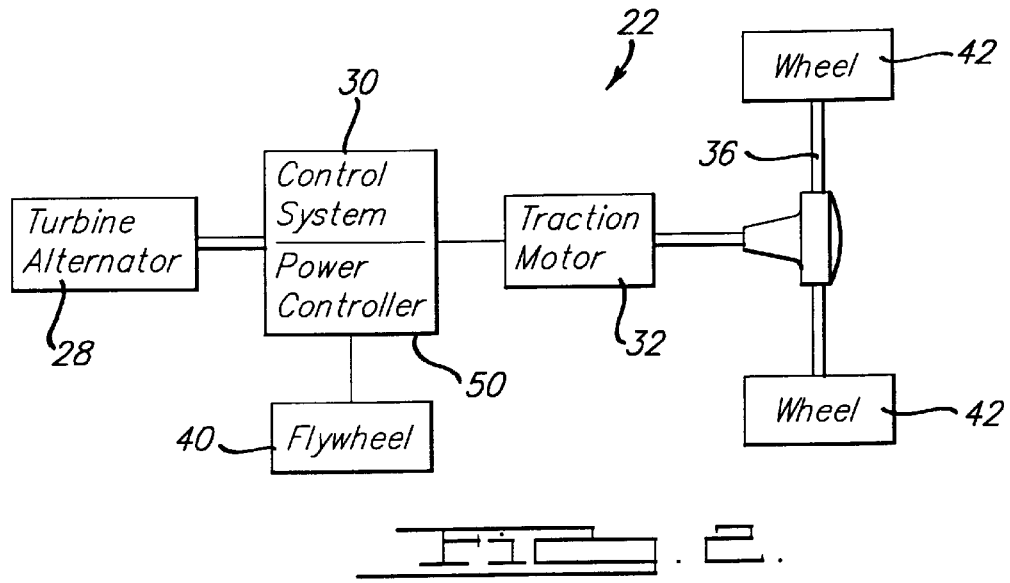
FIG. 2 is a block diagram of an operational relationship of a hybrid powertrain system for a motor vehicle according to the present invention.

Referring to FIGS. 1 and 2, one embodiment of a hybrid powertrain system is illustrated for a vehicle 20. The vehicle 20 is partially shown in a cut away view illustrating a hybrid powertrain system 22 disposed within a chassis 24 of the vehicle 20. The hybrid powertrain system 22 includes an energy source such as a hydrocarbon-based fuel powered generator. In the preferred embodiment, the hydrocarbon-based fuel powered generator is an engine such as a turbine engine 28a fueled by liquefied natural gas. The turbine engine 28a is operatively connected to an alternator 28b. The turbine engine 28a spins the alternator 28b to generate electric power. It should be appreciated that the turbine engine 28a and the alternator 28b may be referred to as a turboalternator 28.

The hybrid powertrain system 22 includes a vehicle management controller 30 which manages the distribution of power within the hybrid powertrain system 22. The vehicle management controller 30 directs the transfer of power from an energy source such as the turboalternator 28 to an energy user or motor such as a traction or induction motor 32 using a power transfer mechanism 34, such as a three-phase variable frequency alternating current (VFAC). In this example, the traction motor 32 is an AC induction traction motor. The traction motor 32 transfers its energy to the drivetrain 36 and eventually to the wheels 42 to propel the vehicle 20.

The hybrid powertrain system 22 also includes an energy storage apparatus such as a flywheel 40. It should be appreciated that the flywheel 40 replaces a battery (not shown but well known in the art) as the energy storage apparatus. The vehicle management controller 30 directs power from the alternator 28b through VFAC lines 34 to the flywheel 40 for storage during periods of low power demand. Alternatively, the vehicle management controller 30 directs the stored energy from the flywheel 40 to the traction motor 32 during periods of increased power demand.

Accordingly, a signal from an accelerator mechanism (not shown) to accelerate the vehicle 20 is communicated to the vehicle management controller 30. The vehicle management controller 30 directs the supply of power to the traction motor 32 so that it can generate a specified torque and, eventually, drive to the wheels 42. If the power delivered to the traction motor 32 is less than that being supplied by the turboalternator 28, the vehicle management controller 30 directs the excess power capacity into the flywheel 40 for storage. If the power required by the traction motor 32 is greater than that being supplied by the turboalternator 28, the vehicle management controller 30 balances the power deficit with energy from the flywheel 40.

In the preferred embodiment, the hybrid powertrain system 22 includes a controller mechanism for further controlling electrical power flow to or from a component. For example, a power controller 50 directs converting, storing and transferring power between the turboalternator 28, traction motor 32 and flywheel 40, based on an instruction from the vehicle management controller 30. The power controller 50 transfers power for start up of the turbine engine 28a, by supplying electrical power to the alternator 28b causing the alternator 28b to act like a motor and spin up the turbine engine 28a until it is running.

The vehicle management controller 30 manipulates and controls the power controller 50 to selectively transfer the power based on various operating conditions of the vehicle 20, and to synthesize a sinusoidal current waveform to operate the turboalternator 28, traction motor 32 and the flywheel 40 at the desired levels.

Preferably, the hybrid powertrain system 22 also includes various critically placed sensors (not shown) which are conventional and well known in the art. The outputs of these sensors communicate with the vehicle management controller 30. It should also be appreciated that the vehicle 20 includes other hardware not shown, but conventional in the art, that cooperate with the hybrid powertrain system 22.

Figure 3:
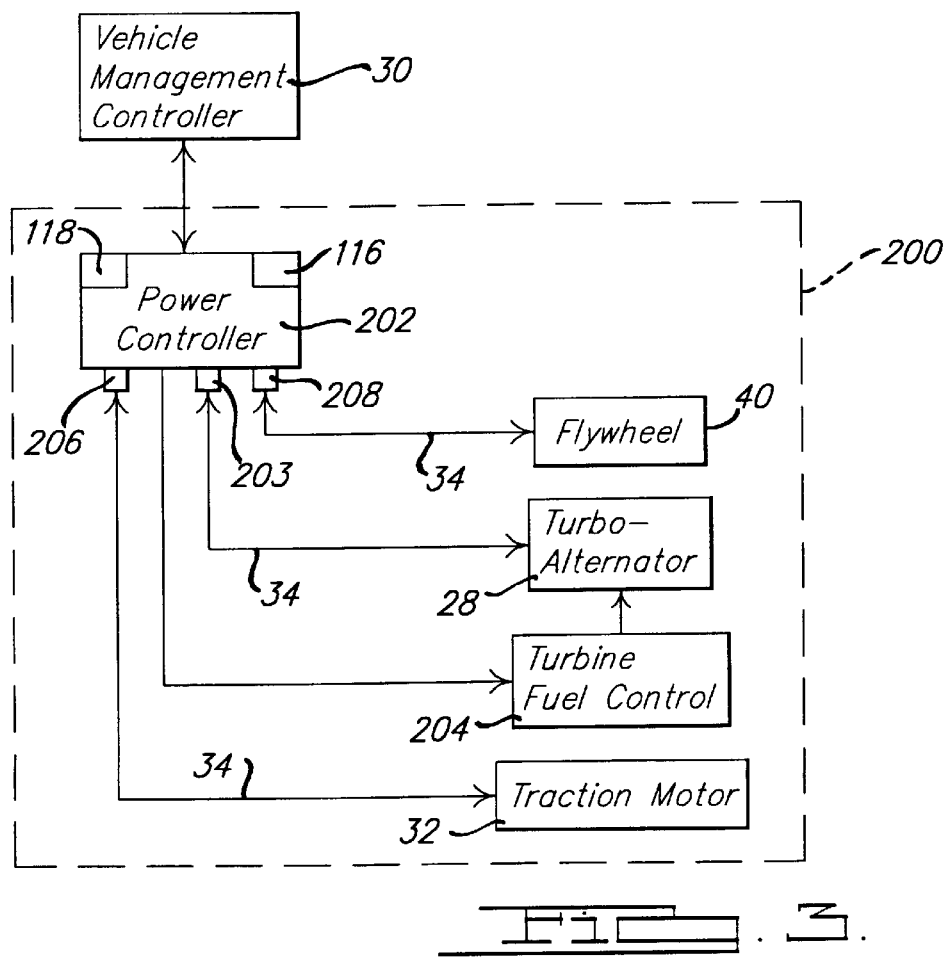
FIG. 3 is a block diagram of a power output level control architecture for a hybrid powertrain system for a motor vehicle according to the present invention.

Referring to FIG. 3, a power output level control architecture 200 is shown for the hybrid powertrain system 22. The power output level control architecture 200 receives input commands from the vehicle management controller 30 and sends system status output information to the vehicle management controller 30. The signals are sent into and sent from a power controller 202. The power controller 202 controls all of the electrical power flow to or from components therein, discussed subsequently. The power controller 202 also performs an orderly shutdown of the power output level control architecture 200 in the event a disturbance is sensed. The power controller 202 further includes a direct current (DC) storage assembly 116, such as a capacitor bank, as is well understood in the art. The DC power is communicated to the power output level control architecture 200 through a DC bus 118, as discussed herein.

The turboalternator 28 provides an output that is substantially constant, as commanded by the vehicle management controller 30, once the turboalternator 28 is past a start up period. The turboalternator 28 output is connected through the VFAC line 34 to the power controller 202, where AC to DC power conversion occurs. During a start, the power on the DC bus 118 is converted to AC in the power controller 202 and transferred through the VFAC line 34 to the turboalternator 28. The alternator 28b momentarily acts as a motor to start the turbine engine 28a. The power controller 202 is also in communication with a turbine fuel controller 204. The turbine fuel controller 204 further controls the delivery of fuel to the turboalternator 28, and is well known to those skilled in the art.

The traction motor 32 is connected to the power controller 202 through the VFAC line 34. The DC to AC conversion, or AC to DC conversion takes place in the power controller 202. For example, the traction motor 32 is a torque regulator and provides power to or draws power from the DC bus 118 at a rate consistent with a specific instantaneous torque requirement. The torque requirement is not a function of the voltage potential across the DC bus 118 and, therefore, does not depend thereon. The torque is a result of controlling the DC to AC conversion.

The flywheel 40 bilaterally transfers power along the VFAC line 34 to the power controller 202, where the AC to DC conversion occurs to connect to the DC bus 118. More specifically, the flywheel 40 performs as the voltage regulator for the DC bus 118 in the power controller 202. The flywheel 40 does so by the bilateral transfer of power therebetween. Of the turboalternator 28, the traction motor 32, and the flywheel 40, only the flywheel 40 transfers power to and from the power controller 202, based on the voltage potential across the DC bus 118.

The control of the voltage potential across the DC bus 118 is accomplished as follows. If the voltage is greater than a predetermined level, power is sent to the flywheel 40 increasing the rotational speed of the flywheel, thus storing energy. Conversely, if the DC bus 118 voltage is lower than a predetermined level, power is drawn from the flywheel 40, thus slowing its rotational speed. It should be appreciated that there is a predetermined range of power than can be stored or withdrawn from the flywheel 40, as well as a predetermined range of energy that can be stored.

Figure 4:
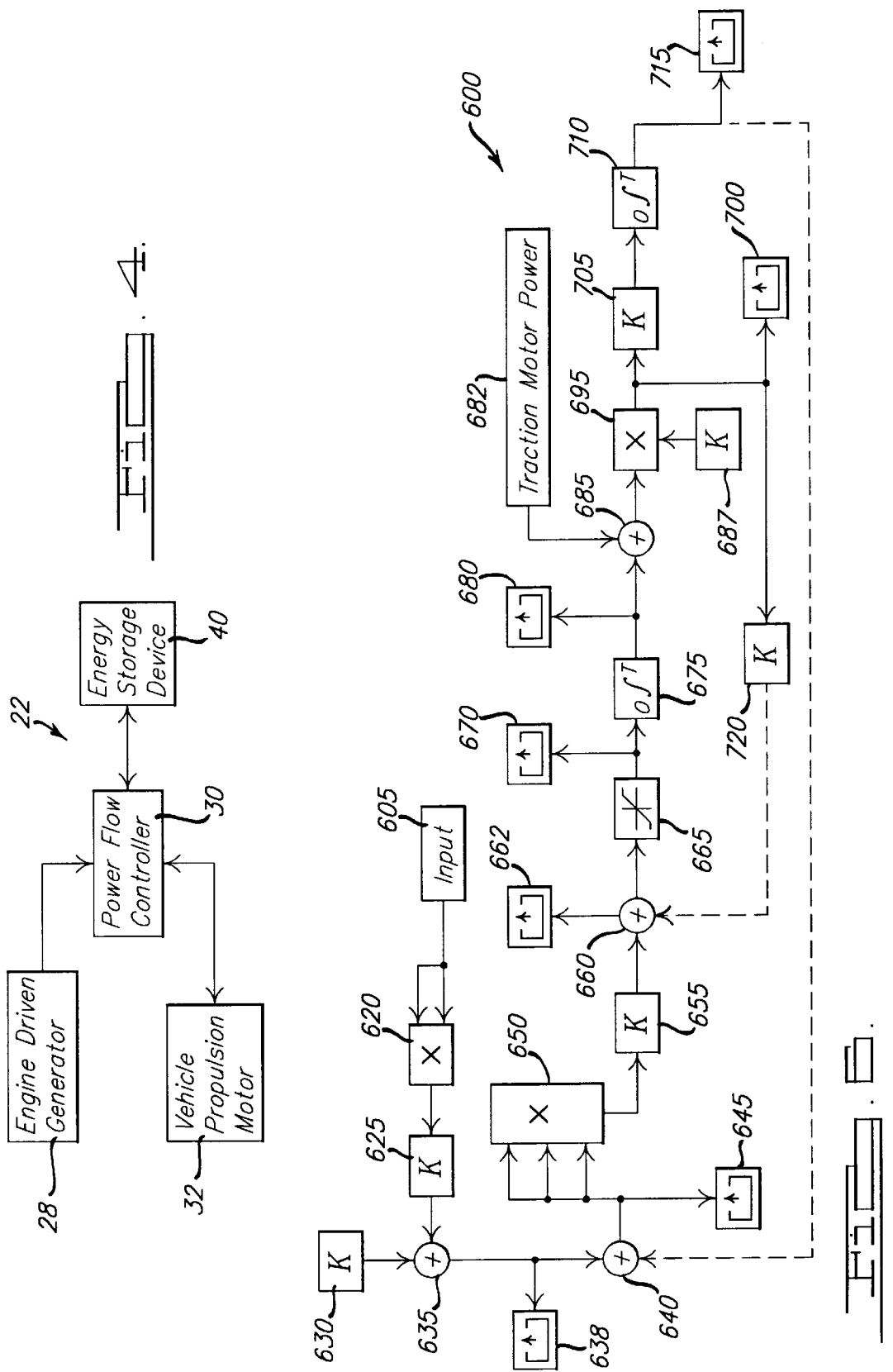
FIG. 4 is a block diagram of power distribution for a hybrid powertrain system for a motor vehicle according to the present invention.

Referring to FIG. 4, a block diagram of power distribution for a hybrid powertrain system 22 is provided. In the hybrid powertrain system 22, an energy source such as the turboalternator 28 of this example, supplies power to both the vehicle propulsion motor or traction motor 32 and the energy storage apparatus or flywheel 40. The flywheel 40 may also supply additional power to the traction motor 32 if power demand is high. The vehicle management controller 30 manages the distribution of power within the hybrid powertrain system 22.

Figure 5:
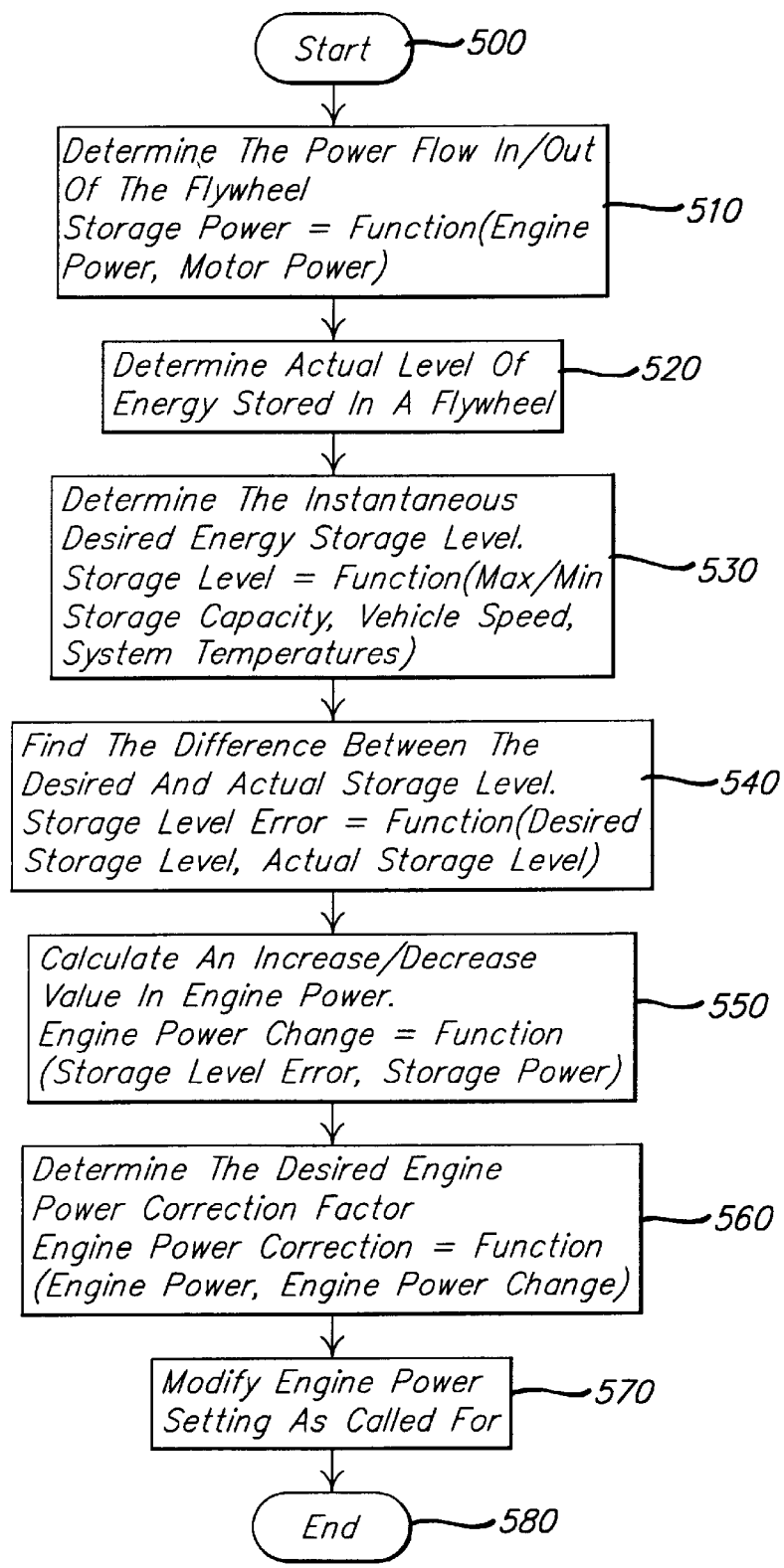
FIG. 5 is a flowchart of a method of power management control for a hybrid powertrain system for a motor vehicle according to the present invention.

Referring to FIGS. 5 and 6, a method, according to the present invention, of power management for a vehicle is illustrated. The methodology provides for a gradual change in a power output from an energy source in order to provide good vehicle performance. It should be appreciated that, in this example, the method is described for a vehicle 20 having the hybrid powertrain system 22 previously described.

Referring to FIG. 5, the methodology begins in block 500 and advances to block 510. In block 510, the methodology determines an actual storage power flow 700, from a power flow into or out of the flywheel 40. For example, the power flow into or out of the flywheel 40 can be expressed as a function of the turboalternator 28 power and the traction motor 32 power. The methodology advances to block 520. In block 520, the methodology determines an actual stored energy level 715 from an actual level of energy stored in the flywheel 40. The methodology advances to block 530.

In block 530, the methodology determines an instantaneous desired level of energy stored 638 in the flywheel 40. For example, the instantaneous desired level of energy stored 638 is determined from a vehicle performance characteristic, such as a maximum or minimum energy storage capacity, a vehicle speed, or a temperature. The methodology advances to block 540 and determines an energy storage level error 645, such as by determining a difference between the instantaneous desired level of energy stored 638 and the actual stored energy level 715 in the flywheel 40.

After block 540, the methodology advances to block 550 and determines a change in power for the turboalternator 28. For example, the turboalternator 28 power change is the power level error 662 expressed as a function of the energy storage level error 645 and the actual storage power flow 700.

After block 550, the methodology advances to block 560 and determines a desired engine power setting 670 for the turboalternator. For example, the desired engine power setting 670 is a function of a current level of turboalternator 28 power and the desired engine power setting 670. The methodology then advances to block 570 and, when called for, modifies the turboalternator 28 power output by the desired engine power setting 670 resulting in a new turboalternator power output level 680. After block 570, the methodology advances to bubble 580 and the methodology ends.

Referring to FIG. 6, a systematic diagram of a power management system 600 for the hybrid powertrain system 22 is provided. The power management system 600 takes place within a control apparatus such as the vehicle management controller 30. The power management system 600 is typical of a feedback control system, as is well known in the art. The power management system 600 has an input 605 that is a vehicle attribute such as vehicle 20 speed, or an instantaneous traction motor 32 power consumption level.

The power management system 600 determines an instantaneous desired level of energy stored 638 in the flywheel 40 by squaring the input 605 in a first multiplier 620. The squared input is multiplied by a first constant in a second multiplier 625. The factored result and a second constant 630, such as a maximum energy storage capacity, are added in a first adder 635, resulting in the instantaneous desired level of energy stored 638 in a flywheel 40 for a particular vehicle operating condition, such as vehicle speed.

The instantaneous desired level of energy stored 638 and an actual stored energy level 715 are combined in a second adder 640, resulting in an energy storage level error 645. The energy storage level error 645 is cubed in a third multiplier 650. The cubed energy storage level error is multiplied by a third constant, such as a conversion factor, in a fourth multiplier 655, resulting in a power equivalent error.

The power equivalent error and an actual storage power flow power error are combined in a third adder 660. The resulting power level error 662 is used in determining the turboalternator 28 power change.

The power level error 662 is compared to a predetermined condition in a first comparator 665 resulting in the desired engine power setting 670 for the turboalternator. An example of a predetermined condition 665 is if the power level error 662 is greater than a predetermined value. Another example of a predetermined condition 665 is if a predetermined period of time has elapsed since the turboalternator power output level 680 was updated.

The power management system 600 then integrates the desired engine power setting 670 in a first integrator 675, so that in this example the engine power is modified in a controlled manner. The turboalternator 28 power output 680 is modified by the desired engine power setting 670.

The power management system 600 then determines a power flow into or out of the flywheel 40 by comparing the turboalternator power output level 680 and a traction motor power level 682 in a fourth adder 685. The result is multiplied by a fourth constant 687, such as an efficiency value, in a fifth multiplier 695, resulting in an actual storage power flow 700 going into or out of the flywheel 40. For example, if the actual storage power flow 700 is a negative value, power is leaving the flywheel 40. Conversely, if the actual storage power flow 700 is a positive value, power is entering the flywheel 40.

The actual storage power flow 700 is multiplied by a fifth constant in a sixth multiplier 705. The result is integrated over time in a second integrator 710, resulting in an actual stored energy level 715. The actual stored energy level 715 is an input to the second adder 640 to determine the instantaneous energy storage level error 645.

The power management system 600 uses the actual storage power flow 700 to determine the power level error 662. The actual storage power flow 700 is multiplied by a sixth constant, such as an efficiency value, in a seventh multiplier 720 resulting in an actual storage power flow error. The actual storage power flow error is an input to the third adder 660 for use in determining the power level error 662.

The present invention has been described in an illustrative manner. It is to be understood that the terminology which has been used is intended to be in the nature of words of description rather than of limitation.

Many modification and variation of the present invention are possible in light of the above teachings. Therefore, within the scope of the appended claims, the present invention may be practiced other than as specifically described.

What is claimed is:

1. A method of power management control for a hybrid powertrain system, said method comprising the steps of:

determining a storage power from a power flow into or out of an energy storage apparatus;

determining an actual level of energy stored in the energy storage apparatus;

determining a desired level of energy stored in the energy storage apparatus;

determining an energy storage level error from a difference between the desired level of energy stored and the actual level of energy stored;

determining an engine power change from the energy storage level error and an actual storage power flow by calculating a power level error as a function of the energy storage level error and an actual storage power flow error;

calculating and engine power setting based upon the engine power change; and modifying an engine power output by the engine power setting.

2. A method as set forth in claim 1 including the step of determining an engine power output.

3. A method as set forth in claim 1 wherein the desired level of energy stored is instantaneously determined from an energy storage capacity in the energy storage apparatus and a vehicle speed.

4. A method as set forth in claim 1 wherein the actual storage power flow error comprises multiplying an actual storage power flow into or out of an energy storage apparatus by a predetermined efficiency value.

5. A method as set forth in claim 4 wherein the actual storage power flow is determined from the engine power setting and a power need of a power user.

6. A method as set forth in claim 5 wherein the power user is a traction motor.

7. A method as set forth in claim 5 wherein the actual level of energy stored is determined using the actual storage power flow.

8. A method of power management control for a hybrid powertrain system, said method comprising the steps of:

determining a storage power from a power flow into or out of an energy storage apparatus;

determining an actual level of energy stored in the energy storage apparatus;

determining a desired level of energy stored in the energy storage apparatus;

determining an energy storage level error by taking a difference between the desired level of energy stored and the actual level of energy stored;

determining a power level error using the energy storage level error and an actual storage power flow error;

determining an engine power change based upon the power flow error;

calculating a desired engine power setting from the engine power change;

calculating a power output of the engine based upon the desired engine power setting; and modifying the engine power output by the desired engine power setting.

9. A method as set forth in claim 8 wherein the desired level of energy stored is instantaneously determined from an energy storage capacity in the energy storage apparatus and a vehicle speed.

10. A method as set forth in claim 8 wherein the actual storage power flow error comprises multiplying an actual storage power flow into or out of an energy storage apparatus by a predetermined efficiency value.

11. A method as set forth in claim 8 wherein the actual storage power flow is determined using the desired engine power setting and a power need of a power user.

12. A method as set forth in claim 11 wherein the power user is a traction motor.

13. A method as set forth in claim 11 wherein the actual level of energy stored is determined using the actual storage power flow.

14. A method of power management control for a hybrid powertrain system, said method comprising the steps of:

determining an actual storage power flow into or out of an energy storage apparatus using an engine power setting and a power need of a power user;

determining an actual level of energy stored in the energy storage apparatus using the actual storage power flow;

determining a desired level of energy stored in the energy storage apparatus using an energy storage capacity in the energy storage apparatus and a vehicle speed;

determining an energy storage level error by taking a difference between the desired level of energy stored and the actual level of energy stored;

determining an actual storage power flow error by multiplying the actual storage power flow by a predetermined efficiency value;

determining a power level error using the energy storage level error and the actual storage power flow error;

determining an engine power change from the power level error;

determining an engine power setting from the engine power change; and modifying the engine power output by the engine power setting.

15. A method as set forth in claim 14 including the step of determining a power output of the engine.

16. A method as set forth in claim 14 wherein the power user is a traction motor.

* * * * *